PHARMACEUTICAL COMPOSITIONS AND METHODS OF INHIBITING HISTAMINE ACTIVITY WITH CARBOXAMIDINE COMPOUNDS

This is a continuation of application Ser. No. 335,853 filed Feb. 26, 1973 now abandoned which is a continuation-in-part of Ser. No. 80,794 filed Oct. 14, 1970, now U.S. Pat. No. 3,734,924.

This invention relates to pharmaceutical compositions and methods of inhibiting histamine activity, and more particularly inhibiting H-2 histamine receptors, with carboxamidine compounds. The carboxamidine compounds normally exist as the addition salts but, for convenience, reference will be made throughout this specification to the parent compounds.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (*Brit. J. Pharmac. Chemother.* 27:427, 1966) as H-1. The carboxamidine compounds of the pharmaceutical compositions and methods of the present invention are distinguished by the fact that they act as histamine receptors other than the H-1 receptor, that is they act at H-2 histamine receptors which are described by Black et al., *Nature* 236,385 (1972). Black et al., cited above, page 390, column 2, state the following: "Mepyramine has been defined as an $H_1$-receptor antagonist[1] and burimamide has now been defined as an $H_2$-receptor antagonist. Used alone, burimamide can antagonize those responses to histamine, such as stimulation of acid gastric secretion, which cannot be blocked by mepyramine; histamine apparently activates $H_2$-receptors to produce these effects." Thus, from the Black et al. paper, H-2 histamine receptors are those histamine receptors which are not inhibited by mepyramine but are inhibited by burimamide. Thus they are of utility in inhibiting certain actions of histamine which are not inhibited by the above mentioned "antihistamines". Inhibitors of H-2 histamine receptors are useful, for example, as inhibitors of gastric acid secretion and as anti-inflammatory agents particularly where the inflammation is kinin radiated.

The carboxamidine compounds which are the active ingredients of the pharmaceutical compositions and are used in the methods of inhibiting H-2 histamine receptors according to this invention are represented by the following formula in which it is understood that the structure of the nucleus is such that the bond between the carbon and nitrogen atoms might equally well be represented as a double bond:

FORMULA I

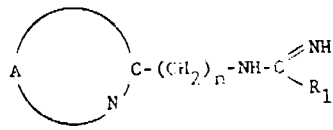

in which:
n is 3 to 5;

A is a chain of 3 to 4 carbon atoms of which 1 to 2 atoms are nitrogen or 1 of which is sulfur in the position α to the carbon atom and the remainder are carbon, which chain forms an unsaturated ring with the carbon and nitrogen atoms to which it is attached and $R_1$ is alkyl having 1 to 4 carbon atoms; phenyl optionally monosubstituted by halogen, hydroxy or nitro; benzyl or lower alkylthio-lower alkyl
and pharmaceutically acceptable acid addition salts thereof.

The ring formed by A and the carbon and nitrogen atoms shown may be, for example, imidazolyl, 2-thiazolyl, 1,2,4-triazolyl, pyrazolyl or pyridyl.

Preferably the ring formed with A and the carbon and nitrogen atoms to which it is attached is 4(5)-imidazolyl.

Most preferably, n is 3 and $R_1$ is methyl; ethyl, phenyl optionally monosubstituted by halo, hydroxy or nitro; benzyl or methylthiomethyl.

The carboxamidines of Formula I may be prepared by the reaction of an amine of the formula:

FORMULA II

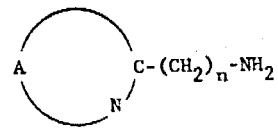

in which n and A have the same significance as in Formula I, with an iminoether of Formula III

FORMULA III

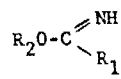

in which $R_1$ has the same significance as in Formula I and $R_2$ is an alkyl group, for example ethyl.

Of the preferred compounds wherein A is such that an imidazol-4(5)-yl ring is formed, the amine starting material of Formula II where $n=3$ may be synthesized from 4(5)-2-chloroethylimidazole; the synthesis of the compound wherein $n=4$ has been described and the compound wherein $n=5$ is prepared from epsilon-aminocaproic acid, (as described in Example 10 hereinafter).

As stated hereinabove the carboxamidines of the compositions and methods of this invention normally exist and are produced as addition salts with acids. Such addition salts include those with hydrochloric, hydrobromic, hydriobic, sulphuric, picric and maleic acids and, as described in a number of the examples hereinafter, the addition salt with one of these acids may readily be converted to that with another. Such conversion may be effected by means of ion-exchange techniques. A particularly useful method which also in many cases effects purification to a sufficient degree to allow the resultant solution of the addition salt to be used for pharmacological estimations involves the formation of the picrate salt and conversion therefrom to the chloride salt.

The pharmaceutical compositions of this invention to inhibit H-2 histamine receptors comprise a pharmaceuand concentrated under reduced pressure, affording 4(5)-(2-cyanoethyl)imidazole, m.p. 70°–71°C. A pure sample of the base, m.p. 71°–73°C., is obtained by recrystallization from isopropyl acetate. A sample of the hydrochloride, m.p. 118°–120°C., is obtained by acidification with dry hydrogen chloride in ether.

A solution of 4(5)-(2-cyanoethyl)imidazole (61 g.) in absolute alcohol (600 ml.) is saturated with gaseous ammonia at −20°C. The resultant solution is hydrogenated over Raney nickel catalyst (approximately 4 g.) at 100 atmospheres pressure for 4 hours at a temperature of 135°–145°C. After cooling, filtration and treatment with charcoal, the solution is concentrated under reduced pressure, affording 4(5)-3-aminopropylimidazole as a low melting solid. For purification, the amine (61 g.) is dissolved in a solution of sodium bicarbonate (82 g.) in water (1.6 l.) and N-carbethoxyphthalimide (122 g.) added over 0.5 hour. After stirring for 1.5 hours, the solid is collected, washed with water and dried. Recrystallization from aqueous ethanol yields 4(5)-(3-phthalimidopropyl)imidazole. A pure sample obtained by further recrystallization from aqueous ethanol has m.p. 160°–162°C.

Hydrolysis with 5N hydrochloric acid for 16 hours followed by removal of phthalic acid yields 4(5)-3-aminopropylimidazole dihydrochloride, m.p. 156°–158°C. (from ethanol-ether). Treatment with sodium ethoxide in ethanol yields pure 4(5)-(3-aminopropyl)imidazole.

Ethyl acetimidate hydrochloride (3.95 g.) is added rapidly to a mixture of di-n-butyl ethyl (25 ml.) and a solution of potassium carbonate (4.4 g.) in water (15 ml.). After shaking briefly, the organic layer is separated, dried over sodium sulphate and filtered. A solution of 4(5)-(3-aminopropyl)imidazole (2.0 g.) in dry ethanol (25 ml.) is added to the filtrate and the resultant solution is allowed to stand at room temperature for seven days. The solution is then filtered, concentrated and acidified with ethanolic hydrogen chloride to give a hygroscopic solid. Recrystallization from ethanol-ether with filtration in a dry atmosphere affords N-[3-(4(5)-imidazolyl)propyl]acetamidine dihydrochloride, m.p. 122°–128°C.

EXAMPLE 2

Preparation of N-[3-(4(5)-imidazolyl)propyl]propionamidine dipicrate

The reaction of 4(5)-(3-aminopropyl)imidazole (1.8 g.) with ethyl propionimidate hydrochloride (4.0 g.) according to the method described in Example 1, followed by the addition of picric acid affords N-[3-(4(5)-imidazolyl)propyl]propionamidine as the dipicrate, m.p. 150°–152°C. (from nitromethane-ethanol).

EXAMPLE 3

Preparation of N-[3-(4(5)-imidazolyl)propyl]phenylacetamidine dihydrochloride

The reaction of 4(5)-(3-aminopropyl)imidazole (2.0 g.) with ethyl phenylacetimidate hydrochlorid (7.5 g.) according to the method described in Example 1 affords N-[3-(4(5)-imidazolyl)propyl]phenylacetamidine dihydrochloride, m.p. 227.5°–230.5°C. (from isopropyl alcohol-ethanol-tetrahydrofuran).

EXAMPLE 4

Preparation of N-[3-(4(5)-imidazolyl)propyl]benzamidine dihydrochloride

The reaction of 4(5)-(3-aminopropyl)imidazole (2.0 g.) with ethyl benzimidate hydrochloride (7.1 g.) according to the method described in Example 1 affords N-[3-(4(5)-imidazolyl)propyl]-benzamidine dihydrochloride, m.p. 221°–223°C. (from ethanoltetrahydrofuran).

EXAMPLE 5

Preparation of N-[3-(4(5)-imidazolyl)propyl]-2-(methylthio)acetamidine dipicrate The reaction of 4(5)-(3-aminopropyl)imidazole (1.8 g.) with ethyl 2 methylthioacetimidate hydrochloride (4.9 g.) according to the method described in Example 1, followed by the addition of picric acid affords N-[3-(4(5)-imidazolyl)propyl]-2-(methylthio)-acetamidine dipicrate, m.p. 116°–117°C. (from nitroethane-ether).

EXAMPLE 6

Preparation of N-[3-(4(5)-imidazolyl)propyl]-p-chlorobenzamidine dihydrochloride The reaction of 4(5)-(3-aminopropyl)imidazole (2.0 g.) with ethyl p-chlorobenzimidate hydrochloride (7.0 g.) according to the method described in Example 1 affords N-[3-(4(5)-imidazolyl)-propyl]-p-chlorobenzamidine dihydrochloride, m.p. 278°–280°C. (from methanol-ethanol).

EXAMPLE 7

Preparation of N-[3-(4(5)-imidazolyl)propyl]-p-nitrobenzamidine dihydrochloride

The reaction of 4(5)-(3-aminopropyl)imidazole (2.0 g.) with ethyl p-nitrobenzimidate hydrochloride (7.3 g.) according to the method described in Example 1 affords N-[3-(4(5)-imidazolyl)-propyl]-p-nitrobenzamidine dihydrochloride, m.p. 304°–305°C. (from methanol-tetrahydrofuran).

EXAMPLE 8

Preparation of N-[3-(4(5)-imidazolyl)propyl]-p-hydroxybenzamidine dihydrochloride The product is prepared by the reaction of 4(5)-(3-aminopropyyl)imidazole with ethyl p-hydroxybenzimidate hydrochloride according to the method described in Example 1.

EXAMPLE 9

Preparation of N-[4-(4(5)-imidazolyl)butyl]acetamidine dihydrochloride

The reaction of 4(5)-(4-aminobutyl)imidazole (2.26 g.) with ethyl acetimidate hydrochloride (3.95 g.) according to the method described in Example 1 afforded N-[4-(4(5)-imidazolyl)-butyl]acetamidine dihydrochloride (2.2 g.), m.p. 182.5°–185°, (from isopropyl alcohol).

EXAMPLE 10

Preparation of N-[5-(4(5)-imidazolyl)pentyl]acetamidine dihydrochloride i. A mixture of 1-bromo-7-phthalimidoheptan-2-one (60.0 g.) (obtainable from epsilon-aminocaproic acid) and formamide (360 ml.) was heated at 180°–185° for 2 hours. Following removal of excess formamide by distillation under reduced pressure, the residue was hydrolysed by heating (under reflux) with 5N hydrochloric acid (1.8 l.) for 18 hours. After cooling to 0° and filtration to remove phthalic acid, the filtrate was concentrated under reduced pressure and the residue extracted with hot ethanol and again concentrated. The residual amine hydrochloride was converted to the free base by passage down Amberlite ion-exchange resin IRA 401 (OH⁻) and elution with methanol. The base obtained was converted into the picrate with picric acid (82.5 g.) in water. The picrate was recrystallised several times from water affording 4(5)-(5-aminopentyl)imidazole dipicrate (55 g.) m.p. 209°–211°. An analytically pure sample had m.p. 210°–211° (from nitromethane).

Found: C, 39.2; H, 3,3; N, 20.3%. $C_8H_{15}N_3 \cdot 2C_6H_3O_7$ requires: C, 39.3; H, 3.5; N, 20.6%).

The picrate was treated with hydrochloric acid in the usual way yielding the amine dihydrochloride (24.6 g.) which was finally converted to 4(5)-(5-aminopentyl)imidazole (15.3 g.), m.p. 45°–8° by passage down ion-exchange resin Amberlite IRA-401 (OH⁻).

The reaction of 4(5)-(5-aminopentyl)imidazole (2.0 g.) with ethyl acetimidate hydrochloride (3.95 g.) according to the method described in Example 1 afforded N-[5-(4(5)-imidazolyl)-pentl]acetamidine dihydrochloride, m.p. 197°–198.5°.

EXAMPLE 11

Preparation of N-[3-(3-(1,2,4-triazolyl)propyl]acetamidine dihydrochloride

The product is prepared by the reaction of 3-(3-amino-propyl)-1,2,4-triazole (prepared from the hydrochloride by refluxing with potassium hydroxide in anhydrous ethanol) with ethyl acetimidate hydrochloride according to the method described in Example 1.

EXAMPLE 12

Preparation of N-[3-(2-pyridyl)propyl]acetamidine dihydrochloride 2-(2-Cyanoethyl)pyridine is reduced with lithium aluminum hydride in ether, in the normal way, yielding 2-(3-aminopropyl)pyridine, b.p. 77°C./0.4 mm. (Dihydrochloride, m.p. 175°–177°C.)

Reacting 2-(3-aminopropyl)pyridine with ethyl acetimidate hydrochloride according to the method described in Example 1 gives the product.

EXAMPLE 13

Preparation of N-[3-(3-pyrazolyl)propyl]acetamidine hydrochloride

Aluminum chloride (43 g.) is added to a stirred solution of 4-phthalimidobutyryl chloride (36.2 g.) in 1,1,2,2-tetrachloroethane (400 ml.), previously saturated with acetylene. Acetylene is bubbled through the solution overnight, with stirring, and the reaction mixture is then decomposed by the addition of crushed ice (300 g.). The organic layer is separated and the aqueous layer extracted with 1,1,2,2-tetrachloroethane (3×100 ml.). The combined organic solution is dried over sodium sulphate and concentrated. The residual solid is recrystallized from hexane affording 1-chloro-6-phthalimidohex-1-en-3-one, m.p. 92°C.

This is immediately caused to react with hydrazine hydrate (19.2 g.) at 95°C. for 10 minutes. Following concentration, the residue is extracted with ether in a Soxhlet apparatus for 3 days. Concentration of the ether extract affords 3-(3-aminopropyl)pyrazole.

The dipicrate has m.p. 194°C. (from nitromethane).

The product is prepared by reacting 3-(3-aminopropyl)-pyrazole with ethyl acetimidate hydrochloride according to the method described in Example 1.

EXAMPLE 14

Preparation of N-[3-(2-thiazolyl)propyl]acetamidine hydrochloride

A mixture of 3-phthalimidothiobutyramide (15.0 g.) and bromoacetaldehyde diethyl acetal (19.7 g.) is heated at 100°C. with frequent agitation for 2 hours. The solid mass is extracted with hot ethanol, and the extracts are treated with charcoal and filtered. On cooling crystals are deposited. There are dissolved in water (50ml.) and the solution washed with ether (25ml.) and diluted with aqueous sodium acetate to pH 6. A yellowish-brown solid crystallizes out which is collected and washed with water yielding 3-(2-thiazolyl)propylphthalimide hydrobromide, m.p. 67°–70°C. The phthalimido derivative (5.0 g.) is dissolved in ethanol (50 ml.), hydrazine hydrate (2 ml.) is added and the solution heated under reflux for 2 hours. The solvent is removed under reduced pressure and the residue is dissolved in concentrated hydrochloric acid (30 ml.) and heated under reflux for 1 hour. After cooling, phthalhydrazide is removed by filtration and the filtrate evaporated to dryness. The residue is recrystallized from methanol-ether yielding 3-(2-thiazolyl)propylamine dihydrochloride, m.p. 160°–165°C.

The product is prepared by reacting 3-(2-thiazolyl)-propylamine (prepared from the amine dihydrochloride by reaction with aqueous sodium hydroxide and extraction with ethyl acetate) with ethyl acetimidate hydrochloride according to the method described in Example 1.

EXAMPLE 15

| Ingredients | Amounts |
| --- | --- |
| N-[3-(4(5)-imidazolyl)propyl]acetamidine dihydrochloride | 150 mg. |
| Sucrose | 75 mg. |
| Starch | 25 mg. |
| Talc | 5 mg. |
| Stearic Acid | 2 mg. |

The ingredients are screened, mixed and filled into a hard gelatin capsule.

EXAMPLE 16

| Ingredients | Amounts |
| --- | --- |
| N-[3-(4(5)-imidazolyl)propyl]-phenylacetamidine dihydrochloride | 150 mg. |
| Lactose | 100 mg. |
| Magnesium stearate | 5 mg. |

The ingredients are mixed and filled into a hard gelatin capsule.

EXAMPLE 17

| Ingredients | Amounts |
| --- | --- |
| N-[3-(4(5)-imidazolyl)propyl]benzamidine dihydrochloride | 100 mg. |
| Lactose | 75 mg. |

The ingredients are mixed and filled into a hard gelatin capsule.

The capsules prepared as in Examples 15–17 are administered orally to a subject having excessive gastric acid secretion within the dose ranges given hereabove.

What is claimed is:

1. A pharmaceutical composition to inhibit H-2 histamine receptors, said H-2 histamine receptors being those histamine receptors which are not inhibited by mepyramine but are inhibited by burimamide, comprising a pharmaceutical carrier, and in an effective amount to inhibit said receptors, a carboxamidine compound of the formula:

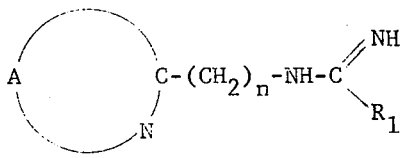

in which:
$n$ is 3 to 5;
A taken together with the carbon and nitrogen atoms shown forms an imidazolyl, 2-thiazolyl, 1,2,4-triazolyl, pyrazolyl or pyridyl ring and
$R_1$ is alkyl having from 1 to 4 carbon atoms; phenyl optionally monosubstituted by halogen, hydroxy or nitro; benzyl or lower alkylthio-lower alkyl or a pharmaceutically acceptable acid addition salt thereof.

2. A pharmaceutical composition according to claim 1 in which A is such that it forms with the carbon and nitrogen atoms shown a 4(5)-imidazolyl ring.

3. A pharmaceutical composition according to claim 1 in which n is 3 and $R_1$ is methyl; ethyl; phenyl optionally monosubstituted by halogen, hydroxy or nitro; benzyl or methylthiomethyl.

4. A method of inhibiting H-2 histamine receptors, said H-2 histamine receptors being those histamine receptors which are not inhibited by mepyramine but are inhibited by burimamide, which comprises administering to an animal requiring said inhibition in an amount sufficient to inhibit H-2 histamine receptors a carboxamidine compound of the formula:

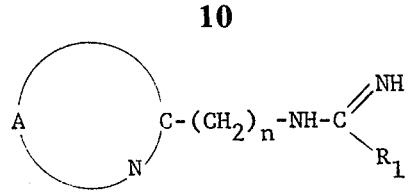

in which:
$n$ is 3 to 5;
A taken together with the carbon and nitrogen atoms shown forms an imidazolyl, 2-thiazolyl, 1,2,4-triazolyl, pyrazolyl or pyridyl ring and
$R_1$ is alkyl having from 1 to 4 carbon atoms; phenyl optionally monosubstituted by halogen, hydroxy or nitro; benzyl or lower alkylthio-lower alkyl or a pharmaceutically acceptable acid addition salt thereof.

5. A method according to claim 4 in which A is such that it forms with the carbon and nitrogen atoms shown a 4(5)-imidazolyl ring.

6. A method according to claim 4 in which n is 3 and $R_1$ is methyl; ethyl; phenyl optionally monosubstituted by halogen, hydroxy or methoxy; benzyl or methylthiomethyl.

7. A method of inhibiting gastric acid secretion which comprises administering internally to an animal in need of inhibition of gastric acid secretion in an amount sufficient to inhibit gastric acid secretion a carboxamidine compound of the formula:

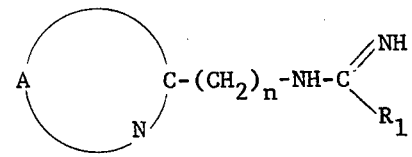

in which:
$n$ is 3 to 5;
A taken together with the carbon and nitrogen atoms shown forms an imidazolyl, 2-thiazolyl, 1,2,4-triazolyl, pyrazolyl or pyridyl ring and
$R_1$ is alkyl having from 1 to 4 carbon atoms, phenyl optionally monosubstituted by halogen, hydroxy or nitro; benzyl or lower alkylthio-lower alkyl or a pharmaceutically acceptable acid addition salt thereof.

8. A method of producing anti-inflammatory acitivity which comprises administering to an animal in need of said activity in an amount sufficient to produce said activity a carboxamidine compound of the formula:

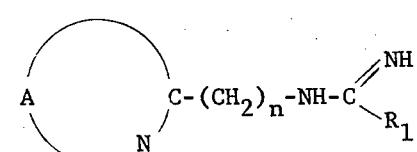

in which:
$n$ is 3 to 5;
A taken together with the carbon and nitrogen atoms shown forms an imidazolyl, 2-thiazolyl, 1,2,4-triazolyl, pyrazolyl or pyridyl ring and
$R_1$ is alkyl having from 1 to 4 carbon atoms; phenyl optionally monosubstituted by halogen, hydroxy or nitro; benzyl or lower alkylthio-lower alkyl or a pharmaceutically acceptable acid addition salt thereof.

* * * * *

UNITED STATES PATENT AND TRADEMARK OFFICE
CERTIFICATE OF CORRECTION

PATENT NO. : 3,881,016
DATED : April 29, 1975
INVENTOR(S) : James Whyte Black, Graham John Durant,
John Colin Emmett and Charon Robin Ganellin It is certified that error appears in the above—identified patent and that said Letters Patent are hereby corrected as shown below:

On the first page of the patent, in the left-hand column, following item [63] insert the following:

[30]   Foreign Application Priority Data

October 29, 1969     United Kingdom 52891/69

*Signed and Sealed this*

*twenty-fourth* Day of *February 1976*

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,881,016
DATED : April 29, 1975
INVENTOR(S) : James Whyte Black, Graham John Durant,
John Colin Emmett and Charon Robin Ganellin It is certified that error appears in the above-identified patent and that said Letters Patent are hereby corrected as shown below:

On the first page of the patent, in the left-hand column, in [73] Assignee, "Hartfordshire" should read -- Hertfordshire -- .

Column 1, line 49, "kinin radiated" should read -- kinin-mediated -- .

Column 2, line 56, "hydriobic" should read -- hydriodic -- .

Column 5, line 64, "hydrochlorid" should read -- hydrochloride -- .

Signed and Sealed this twenty-first Day of October 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,881,015
DATED : April 29, 1975
INVENTOR(S) : James Whyte Black, Graham John Durant, John Colin Emmett and Charon Robin Ganellin It is certified that error appears in the above-identified patent and that said Letters Patent are hereby corrected as shown below:

On the first page of the patent, in the left-hand column, following item [63] insert the following:

[30]  Foreign Application Priority Data

October 29, 1969     United Kingdom 52891/69

Signed and Sealed this twenty-fourth Day of February 1976

[SEAL]

Attest:

RUTH C. MASON
*Attesting Officer*

C. MARSHALL DANN
*Commissioner of Patents and Trademarks*